(12) United States Patent
Reamsnyder et al.

(10) Patent No.: US 7,419,525 B2
(45) Date of Patent: Sep. 2, 2008

(54) FILTER AND METHOD OF MAKING

(75) Inventors: Christopher R. Reamsnyder, Perrysburg, OH (US); Robert L. Smith, Roudolph, OH (US)

(73) Assignee: Honeywell International Inc., Morristown, NJ (US)

( * ) Notice: Subject to any disclaimer, the term of this patent is extended or adjusted under 35 U.S.C. 154(b) by 233 days.

(21) Appl. No.: 11/241,245

(22) Filed: Sep. 30, 2005

(65) Prior Publication Data

US 2006/0070364 A1    Apr. 6, 2006

Related U.S. Application Data

(60) Provisional application No. 60/615,481, filed on Oct. 1, 2004.

(51) Int. Cl.
| | |
|---|---|
| B01D 50/00 | (2006.01) |
| B01D 59/50 | (2006.01) |
| B01D 24/00 | (2006.01) |
| B01D 25/00 | (2006.01) |
| B01D 27/00 | (2006.01) |
| B01D 29/46 | (2006.01) |

(52) U.S. Cl. .............................. 55/484; 55/337; 55/523; 210/315; 210/435; 210/490

(58) Field of Classification Search .................... 55/337, 55/523, 484; 210/315, 490, 435
See application file for complete search history.

(56) References Cited

U.S. PATENT DOCUMENTS

| | | | |
|---|---|---|---|
| 3,309,848 A | 3/1967 | Schwab | |
| 3,330,101 A | 7/1967 | Murphy, Jr. | |
| 3,347,026 A | 10/1967 | Zankey | |
| 3,358,427 A | 12/1967 | Bub | |
| 3,680,286 A * | 8/1972 | Nostrand et al. | 55/484 |
| 4,525,184 A * | 6/1985 | Tassicker | 55/302 |
| 6,315,130 B1 * | 11/2001 | Olsen | 210/490 |
| 6,673,136 B2 | 1/2004 | Gillingham et al. | 95/273 |
| 2005/0035052 A1 * | 2/2005 | Kelly et al. | 210/435 |

FOREIGN PATENT DOCUMENTS

EP        556932 A1 *    8/1993

OTHER PUBLICATIONS

New Generation Direct Flow Engine Air Filters—Performance Analysis, Tadeusz Jaroszczyk, Stephen L. Fallon, Byron A. Pardue, Z. Gerald Liu, Kelly Schmitz, Fleetguard Inc., Apr. 2004.
PicoFlex, the new compact air cleaner for your highest requirements; Mann+Hummel, date unknown.
International Search Report for PCT/US05/35234 dated Jul. 25, 2006, 3 pgs.
Written Opinion for PCT/US05/35234 dated Jul. 25, 2006, 3 pgs.

* cited by examiner

*Primary Examiner*—Walter D. Griffin
*Assistant Examiner*—Amber Miller Harris

(57) ABSTRACT

A filter, comprising: a plurality of individual elongated members arranged into a configuration, each of the plurality of elongated members having an internal cavity extending completely therethrough, the plurality of individual elongated members being formed from a filter media for filtering a fluid, the filter having a first end and a second end defined by the ends of the plurality of individual elongated members and a plurality of areas defined between each of the plurality of individual elongated members, wherein fluid flow is blocked at the first end by sealing the plurality of areas at the first end with a sealing material and fluid flow is blocked at the second end by sealing the internal cavity of each of the plurality of individual elongated members at the second end with a sealing material, wherein fluid flow through the filter must pass through the filter media.

3 Claims, 4 Drawing Sheets

FILTER AND METHOD OF MAKING

CROSS-REFERENCE TO RELATED APPLICATIONS

This application claims the benefit of U.S. Provisional Patent Application Ser. No. 60/615,481, filed Oct. 1, 2004, the contents of which are incorporated herein by reference thereto.

TECHNICAL FIELD

The present invention relates to a fluid filter and a method for making the same.

BACKGROUND

Air induction housing systems are continually being challenged to become smaller and unique in shape without loss of system performance. In particular and referring to vehicular applications, this is due in part to the reduction in available real estate in the engine compartment. As vehicle profiles are reduced and engine systems become more complex there is very little available space for the air induction system, which is a critical component of the engine. The air induction system in an internal combustion engine of a vehicle provides at least two important functions; providing a means for delivery of air into the combustion chambers of the engine and providing a means for filtering the air prior to its delivery to the combustion chambers. Due to its filtering function the filter itself needs to be replaced after an extended period of use thus, accessibility to the filter is also a requirement imposed upon the air induction system as well as the housing.

In some designs the air induction system is not designed until the engine design is completed thus, the designers of the air induction system are typically faced with the problem of providing a predetermined amount of airflow to the engine while also being presented with a limited or unique amount of space between the engine and the vehicle hood, front grill etc. Accordingly, the air induction housing typically has a unique configuration that is optimized for flow and space requirements, which may be contradictory to design requirements for the filter to be located with in the air induction system.

Furthermore, reducing the housing size and creating unique shapes limits the overall size of the filter capable of being disposed therein. Accordingly, and based upon conventional airflow technology, smaller filters typically result in less capacity thus, reduced performance.

Accordingly, it is desirable to provide a filter and method of manufacture wherein the filter is capable of providing increased capacity while also accommodating the reduced size and shape limits.

SUMMARY OF THE INVENTION

A filter and method of making is provided. Exemplary embodiments provide a filter, comprising: a plurality of individual elongated members arranged into a configuration, each of the plurality of elongated members having an internal cavity extending completely therethrough, the plurality of individual elongated members being formed from a filter media for filtering a fluid, the filter having a first end and a second end defined by the ends of the plurality of individual elongated members and a plurality of areas defined between each of the plurality of individual elongated members, wherein fluid flow is blocked at the first end by sealing the plurality of areas at the first end with a sealing material and fluid flow is blocked at the second end by sealing the internal cavity of each of the plurality of individual elongated members at the second end with a sealing material, wherein fluid flow through the filter must pass through the filter media.

A filter configured for a non-uniform housing, comprising: a plurality of individual elongated members varying in lengths with respect to width, the plurality of individual elongated members being arranged into a non-uniform configuration, each of the plurality of elongated members having an internal cavity extending completely therethrough, the plurality of individual elongated members being formed from a filter media for filtering a fluid, the filter having a first end and a second end defined by the ends of the plurality of individual elongated members and a plurality of areas defined between each of the plurality of individual elongated members, wherein fluid flow is blocked at the first end by sealing the plurality of areas at the first end with a sealing material and fluid flow is blocked at the second end by sealing the internal cavity of each of the plurality of individual elongated members at the second end with a sealing material, wherein fluid flow through the filter must pass through the filter media.

A non-uniform filter configured for a non-uniform housing, comprising: a plurality of individual elongated members varying in lengths with respect to width, the plurality of individual elongated members being arranged into a non-uniform configuration, the non-uniform configuration including a non-uniform length and a non-uniform width that defines a periphery of the filter, each of the plurality of elongated members having an internal cavity extending completely through the non-uniform length, the plurality of individual elongated members being formed from a filter media for filtering a fluid, the filter having a first end and a second end defined by the non-uniform length, the ends of the plurality of individual elongated members and a plurality of areas defined between each of the plurality of individual elongated members, wherein fluid flow is blocked at the first end by sealing the plurality of areas at the first end with a sealing material and fluid flow is blocked at the second end by sealing the internal cavity of each of the plurality of individual elongated members at the second end with a sealing material, wherein fluid flow through the filter must pass through the filter media.

A method for making a filter, comprising: grouping a plurality of individual elongated filter members into a configuration, the plurality of individual elongated filter members having varying lengths and each of the plurality of individual elongated filter members having a passage extending therethrough; sealing portions of one end of the filter by sealing areas defined between the exteriors of each of the plurality of individual elongated filter members; and sealing portions of another end of the filter by sealing the passage of the plurality of individual elongated filter members.

A method for making a filter, comprising: grouping a plurality of individual elongated members into a cavity of a tool, the cavity defining a non-uniform configuration, the plurality of individual elongated members being formed from a filter media for filtering a fluid and each of the plurality of individual elongated members having a passage extending therethrough; sealing portions of one end of the filter by sealing areas defined between the exteriors of each of the plurality of individual elongated members; and sealing portions of another end of the filter by sealing the passage of the plurality of individual elongated members.

The above-described and other features are appreciated and understood by those skilled in the art from the following detailed description, drawings, and appended claims.

DETAILED DESCRIPTION OF EXEMPLARY EMBODIMENTS

In accordance with exemplary embodiments of the present invention, a filter and method of making a filter is disclosed. In an exemplary embodiment the filter will be comprised of a plurality of individual elongated members arranged into a configuration defined by a shaping or molding process that will allow the members to be arranged into a non-uniform configuration with respect to a length and width of the filter. Each of the members will be formed from a filter media and will have an internal cavity extending completely therethrough. Once arranged and due to the exterior configurations of the members, areas will be defined between the exteriors of each of the plurality of individual elongated members. Fluid flow is facilitated through the media of the members by sealing the areas between the members at one end of the filter and another end of the filter will only have the internal cavity of each of the members being sealed. Thus, fluid flow will be able to enter the cavities at one end and exit through the un-sealed areas at the other end or vice versa. Furthermore, the filter media of each of the members extends along with each of the members thereby increasing the surface area of the media.

Accordingly and due to this unique configuration more surface filter area is provided without restricting fluid flow since a plurality of cavities are provided. In addition, the filter is able to have a unique non-uniform configuration due to the arrangement of the individual filter members.

Reference is made to the following documents entitled: New Generation Direct Flow Engine Air Filters—Performance Analysis; Mann+Hummel PicoFlex; and U.S. Pat. No. 6,673,136 each of which has been identified and submitted in an information disclosure statement, which has been filed contemporaneously with the present application. The contents of each of these documents are incorporated herein by reference thereto.

Figure 1:
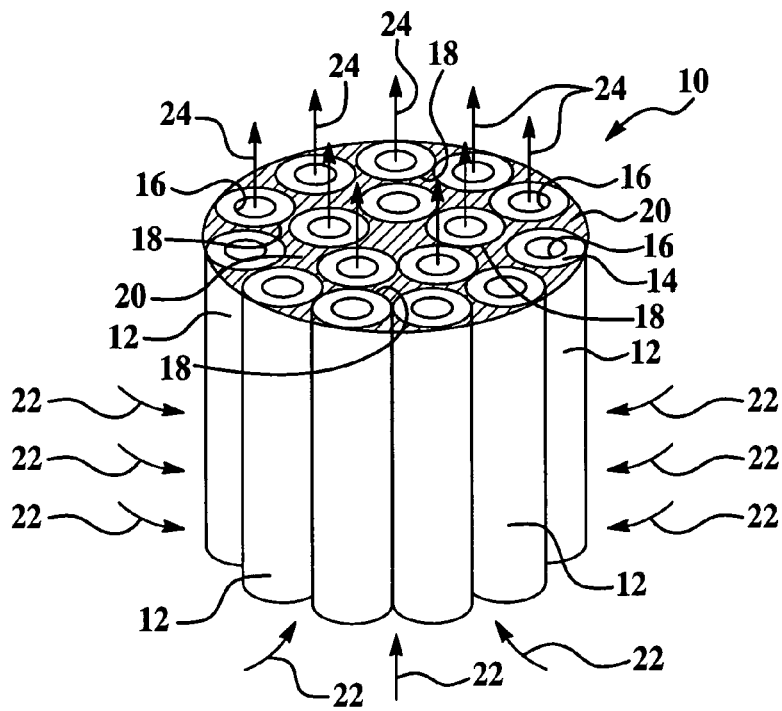
FIG. 1 is a perspective view of a filter constructed in accordance with an exemplary embodiment of the present invention.
Figure 2:
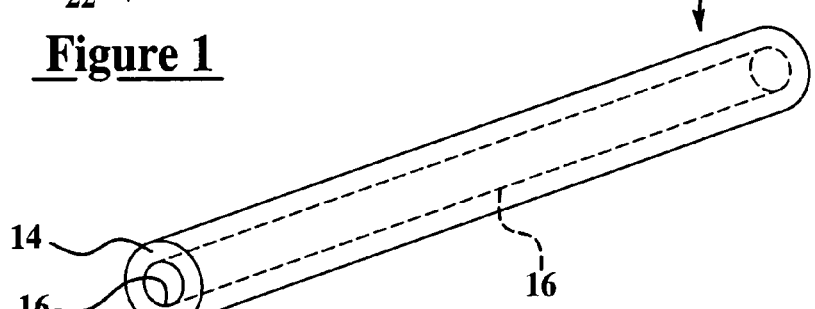
FIG. 2 is a perspective view of an elongated filter member used in the construction of the filter of FIG. 1.

Referring now to FIGS. 1 and 2, a filter 10 constructed in accordance with an exemplary embodiment of the present invention is illustrated. Here filter 10 is constructed from a plurality of filter members 12. In one exemplary embodiment filter members 12 are formed from an extruded media 14 wherein an internal cavity 16 is defined therein. Media 14 is configured to filter a fluid passing through it. Non-limiting types of media are synthetic or natural fibers or non-woven materials and non-limiting examples of the fluid to be filtered are air, water, fuels and oils. Accordingly, media 14 is any type of media that can be configured into an elongated member, which will allow fluid to pass through the media of the member, which will provide a filtering feature.

Internal cavity 16 extends completely through member 12 and provides a passage for fluid flow therethrough. A non-limiting example of the extruded filter member 12 is available from Porex Corporation, Porex Porous Product Group or any of their affiliates. Other non-limiting examples of the filter media for member 12 are synthetic, nano-fibers, cellulose or natural fibers or non-woven materials or any combination of the foregoing capable of being extruded into an elongated member. Although cylindrical elongated tubes are illustrated in the figures it is contemplated that numerous configurations (e.g., triangular, rectangle, trapezoid, combinations thereof, etc.) of member 12 are considered to be within the scope of the present invention. Desirable configurations will provide areas between the same when they are arranged together.

In accordance with an exemplary embodiment of the present invention a plurality of members 12 are provided to a cavity or mold, which is configured to match the intended use of filter 10 (e.g., an air filter housing). In accordance with an exemplary embodiment the cavity or mold will define the periphery as well as the end portions of the filter. Once an appropriate amount of members are located into the cavity or mold the same is closed or applied to a second mold portion (e.g., a top mold portion or cavity is placed on top of a bottom mold cavity) to align the members with the configuration of the mold. The circular configuration of members 12 assists in the alignment of the members. In one embodiment it is contemplated that the diameter or cross section of each of the members is identical. In an alternative embodiment, members of varying diameter and/or configurations and cross section are configured for use in the construction of the filter.

As illustrated in FIG. 1 once the members are aligned to form the configuration of filter 10, and due to the exterior configuration of the members, a plurality of areas 18 are disposed between the members comprising filter 10. As shown areas 18 may vary in size and configuration or may be similar in size and configuration. In order to ensure that the fluid flow through filter 10 passes through the media of the members areas 18 are sealed at one end of the filter by a sealing material 20 and internal cavity 16 of the members is sealed at the other end (i.e., the bottom surface not visible in FIG. 1). Thus, an alternating fluid flow path is provided through the filter (e.g., fluid first flows into either area 18 or cavity 16 depending on which end of the filter is used as the inlet and which end is used as the outlet) and then the fluid is filtered as it passes through the filter media in order to exit from the filter. Moreover, the sealing material disposed at either end of the filter is applied with a thickness only necessary to prevent fluid flow therethrough so that the majority of the fluid paths extending along the length of the extruded members (e.g., either cavities 16 or areas 18) are used for filter surface area. Accordingly, and by using this extended length as well as varying lengths of the extruded members (e.g., not uniform end portions) the available filter surface area is increased as the non uniform and portions allow for longer extruded members and thus longer cavities 16 or areas 18 in order to provide more filter surface area. In addition, exemplary embodiments of the present invention allow the extruded members to be manipulated within forming tools prior to the application of sealing material 20 thus, each of the extruded members 12 may slide within the forming tool as well as with respect to each other to provide non-uniform end portions, which are shown in a non-limiting examples in FIGS. 6 and 7. One non-limiting method for manipulating the extruded members prior to the application of the sealing member would be to provide a second tool with a plurality of protrusions which correspond to desired non-uniform configurations of the extruded members.

In accordance with an exemplary embodiment a non-limiting example of sealing material 20 is plastisol, urethane, plastic or any other equivalent sealing material, which will block or prevent fluid flow thus, forcing the fluid to travel through the filter media. Sealing material 20 is capable of being applied to seal the appropriate openings in a viscous or liquid state and when cured, provides an impervious seal to the fluid thus, forcing the same through the media. In addition, sealing material 20 can be used to hold members 12 together.

Thus, and as a fluid flows into filter 10 (illustrated by arrows 22) it must first pass through media 14 before it flows out through cavities 16 in the direction of arrows 24. As shown, fluid flow may be through the periphery of the filter as well as one of the end portions wherein the media will filter the fluid passing there through. Alternatively, the filter may be configured to filter fluid passing into one and portion and then through the opposite end portion wherein the interior cavities of the media members provides the extended surface area for filtering the fluid as it passes therethrough.

In an alternative embodiment it is contemplated that the fluid can flow in the opposite direction that is into internal cavities 16 first and then out through areas 18. In either embodiment the fluid must flow through media 14 and is therefore filtered before it passes through filter 10.

As discussed above, air induction housing systems are continually being challenged to become smaller and unique in shape without loss of system performance. Exemplary embodiments of the present invention allow unique filter sizes to be manufactured wherein the peripheries or side walls of the filter are uniquely configured as well as the end portions by for example, sliding to the plurality of extruded members with respect to each other and within the forming tool prior to the application of the sealant. Therefore and in accordance with an exemplary embodiment of the present invention, unique filters are capable of being manufactured with non-uniform configurations along the side walls or peripheries as well as non-uniform configurations at either end portion, which may comprise the inlet and outlet of the filter. Since individual members are used the same are easily manipulated during the manufacturing process. For example, during manufacturing or forming of the filter a plurality of individual filter members are introduced into the mold and once the mold is closed the filter members are compressed together and the ends are sealed as discussed above.

Accordingly and through the use of individual members unique configurations or peripheries of filter 10 are achieved. Therefore, unique filter housings may also be employed.

Figure 3:
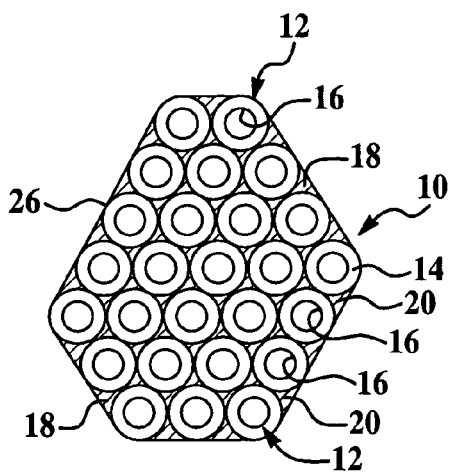
FIG. 3 is an end view of a filter constructed in accordance with an exemplary embodiment of the present invention.
Figure 4:
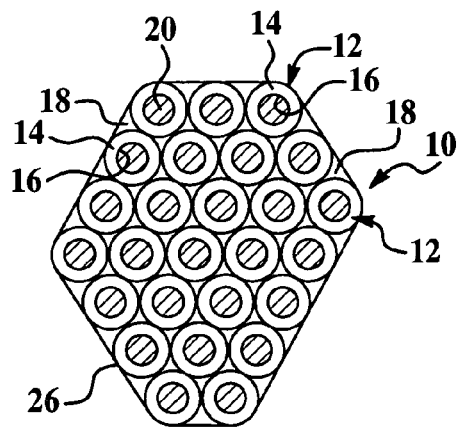
FIG. 4 is an opposite end view of the filter illustrated in FIG. 3.
Figure 5:
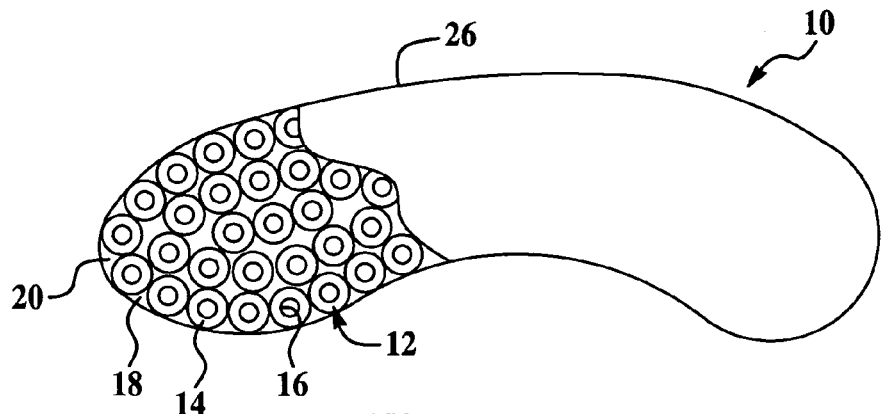
FIG. 5 is an end view of a filter constructed in accordance with an alternative exemplary embodiment of the present invention.

Non-limiting examples are shown in FIGS. 3-5. FIGS. 3 and 4 illustrate a first end and a second end of the filter. FIG. 3 illustrates the end with the areas 18 between the members sealed while FIG. 4 illustrates the end with the internal cavities 16 of the filter sealed. In the embodiment shown in FIGS. 3 and 4, an exterior periphery 26 of the filter is configured for a matching filter housing. As illustrated, periphery 26 is unique and typically would not be achievable by traditional filters their media and their related manufacturing techniques.

FIG. 5 illustrates another unique non-uniform (kidney shape) periphery obtainable by using individual filter members 12. Thus, filter 10 is capable of being manufactured with a curved periphery or a straight periphery. It is, of course, understood that numerous other configurations are obtainable through the use of individual filter members. For example, and referring now to FIGS. 6 and 7 other alternative non-limiting filter configurations are illustrated. Here filter 10 is provided with irregular or non-uniform first and second ends or alternatively one uniform end and one non-uniform end or alternatively one partially uniform end at either or both sides of the filter. Again and through the use of individual filter members 12 and the configuration of the filter cavity the filter members can be arranged by the mold of the filter member. This step will typically occur before the sealing material 20 is applied.

Another alternative method for forming or manufacturing a filter is to dispose a plurality of members onto a non-uniform portion of the mold and cut the opposite end so that there is a non-uniform end and a uniform end. Again, this is achievable through the use of a plurality of individual filter members which are later sealed together.

In accordance with an exemplary embodiment, members 12 are held together by sealing material 20. In addition, and in another alternative embodiment a screen and bead of sealant is disposed on the exterior or periphery of the filter in order to hold the same together.

Filter 10 through the use of a plurality of members 12 is able to provide a unique compact filter configuration without loss of system performance since a plurality of members with internal cavities 16 are used and accordingly the surface area of media 14 is increased. Thus, more surface area is available for filtering for a filter for a given size.

Figure 8:
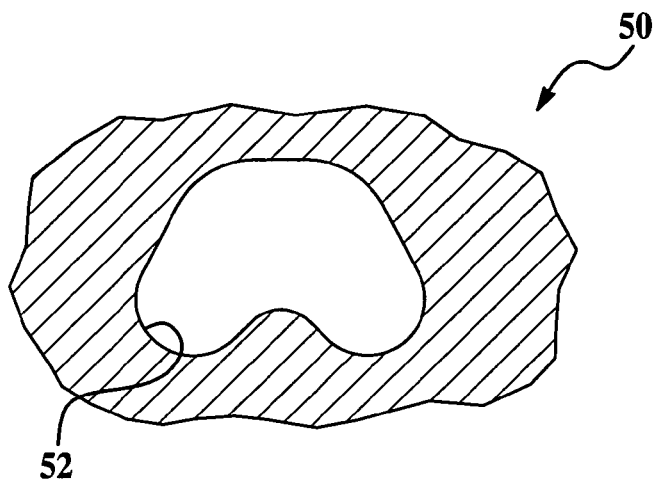
FIG. 8 is a top view of a tool for use in a method of making a filter in accordance with an exemplary embodiment of the present invention.

FIG. 8 illustrates a tool or mold 50 contemplated for use in forming or manufacturing filters in accordance with exemplary embodiments of the present invention. Here mold 50 defines a cavity 52 for placement over a plurality of members 12. Once members 12 are inserted therein each end is applied with a sealing material to provide the sealing of internal cavities 16 at one end and the areas 18 at the other end.

Figure 6:
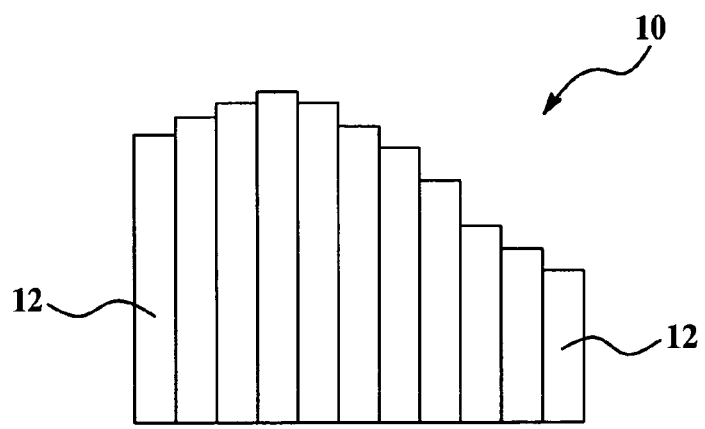
FIG. 6 is a side elevational view of a filter constructed in accordance with another alternative exemplary embodiment of the present invention.
Figure 7:
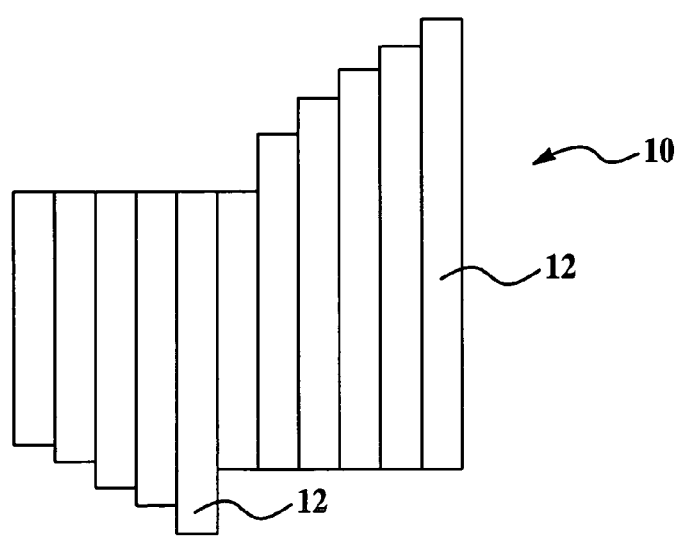
FIG. 7 is a side elevational view of a filter constructed in accordance with another alternative exemplary embodiment of the present invention.
Figure 9:
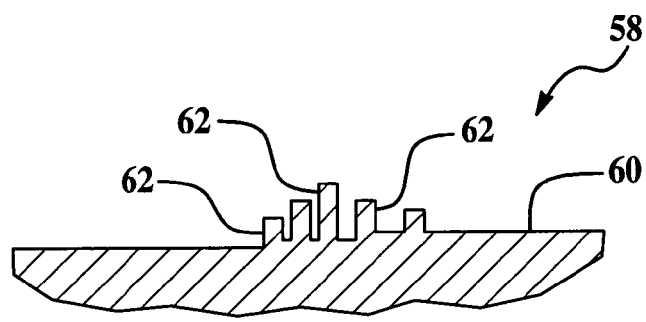
FIG. 9 is a side elevational view of a tool for use in a method of making a filter in accordance with an alternative exemplary embodiment of the present invention.

Referring now to FIG. 9, a tool 58 is illustrated. Tool 58 has a surface 60 with a plurality of protrusions 62, which are configured to provide varying heights or positions of members 12 with respect to each other prior to the sealing step of filter 10. Thus, tool 58 is an example of a tool used to manipulate some of the individual members of filter 10 prior to its final manufacturing step wherein the members are no longer capable of individual movement with respect to each other. FIGS. 6 and 7 illustrate some non-limiting examples of filters made using tool 58.

In accordance with an exemplary embodiment it is contemplated that tool 50 and tool 58 are used in conjunction with one another or to define the periphery and the end portions of the filter as it is being formed by placing a plurality of members into the tools.

Figure 10:
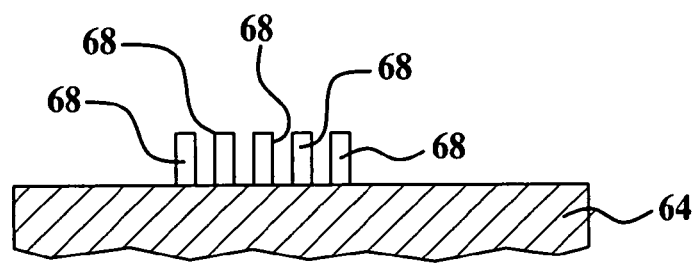
FIG. 10 is a side elevational view of a tool for use in a method of making a filter in accordance with exemplary embodiments of the present invention.

FIG. 10 illustrates a tool contemplated for providing the sealing of the openings at one end of the filter. Here a tool 64 will comprise a plurality of pins 68 each being configured to be received in either the openings 16 of filter members 12 or the areas 18 disposed therebetween. Thus, each pin 68 is configured to match and block either opening 16 or area 18 while leaving the other area or opening free to be sealed by the sealing material. Accordingly, the periphery of pins 68 is configured to match the opening or area it is intended to seal. In other words at one end of the filter areas 18 are blocked by pins 68 of tool 64 and sealing material 20 is received in openings 16, then on the other end of the filter another tool with pins 68 configured to be received in openings 16 is applied and the sealing material is only received in areas 18. Thus, one end of the filter has areas 18 blocked while openings 16 are blocked on the other end.

Figure 11:
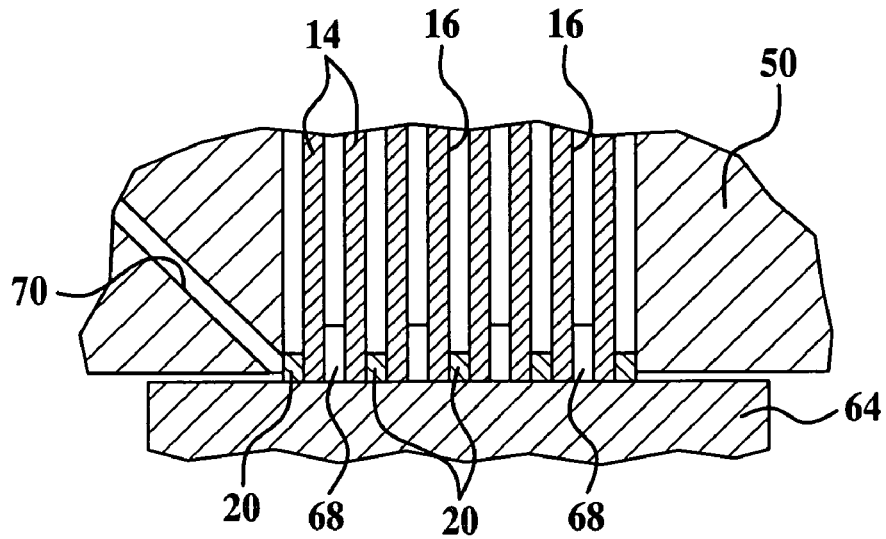
FIG. 11 is a side elevational view of the tools used forming a filter in accordance with one of the exemplary embodiments of the present invention.
Figure 12:
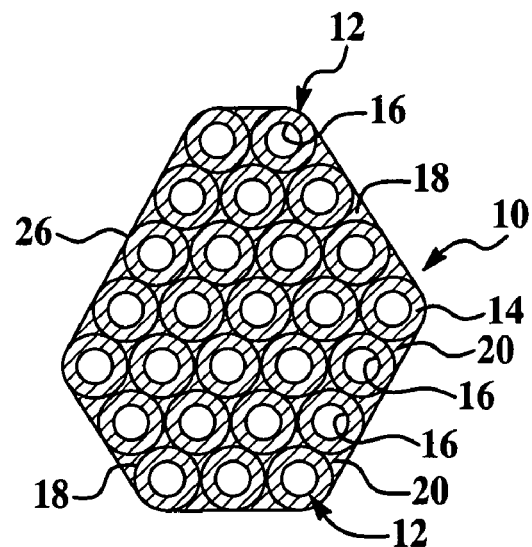
FIG. 12 is an end view of a filter constructed in accordance with an alternative exemplary embodiment of the present invention.

Referring now to FIG. 11, and accordance with an exemplary embodiment, and once tool 50 with a plurality of members disposed therein is placed above tool 58 pins 68 are received within the appropriate area (e.g., cavities 16 or areas 18, of course it is understood that pins 68 will be configured to match cavities 16 or areas 18) and either tool 50 or tool 58 or both is provided with an injection mold opening 70 wherein adhesive or sealing material 20 is able to be inserted therein using injection molding processes known to those skilled and the related arts. It is, of course, also understood that pneumatic presses or other equivalent devices are contemplated for use in applying necessary pressures to tools 50 and 64 in order to allow for the injection molding and curing of sealant 20 to take place.

In an alternative embodiment, tool 58 may be configured to have pins 68 depend away from the ends of protrusions 62 illustrated in FIG. 9 in order to provide an apparatus (e.g. tools 50 and 58) for sealing one end of the filter while also alternating the lengths of the filter members disposed on either end. In yet another alternative exemplary embodiment, pins 68 may depend away from the surface 60 of the tool (e.g., disposed between protrusions 62).

In yet another alternative exemplary embodiment the end of the members 12 disposed on pins or protrusions 68 are positioned slightly away from the surface of the tool from which pins 68 protrude. Accordingly, sealant 20 would be allowed to flow around the ends of members 12 as well as into cavities 18. An example of this sealing configuration is illustrated in FIG. 13.

In accordance with exemplary embodiments of the present invention a filter and method for making is provided. The filter is contemplated for use in smaller or unique housing shapes, while maintaining system performance.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for making a filter, comprising:

extruding a plurality of separately formed individual elongated filter members from a filter media;

grouping the plurality of separately formed individual elongated filter members into a configuration such that an exterior surface of each of the plurality of separately formed individual elongated members contacts an exterior surface of at least one other of the plurality of separate individual elongated members, the plurality of individual elongated filter members having varying lengths and each of the plurality of individual elongated filter members having a passage extending therethrough;

sealing portions of one end of the filter by sealing areas defined between the exteriors of each of the plurality of individual elongated filter members;

sealing portions of another end of the filter by sealing the passage of the plurality of individual elongated filter members; and placing one end of the configuration onto a non-uniform tool wherein the plurality of individual elongated members are relocated prior to the sealing steps.

2. A method for making a filter, comprising:

grouping a plurality of individual elongated members into a cavity of a tool, the cavity defining a non-uniform configuration, the plurality of individual elongated members being formed from a filter media for filtering a fluid and each of the plurality of individual elongated members having a passage extending therethrough;

sealing portions of one end of the filter by sealing areas defined between the exteriors of each of the plurality of individual elongated members; and sealing portions of another end of the filter by sealing the passage of the plurality of individual elongated members.

3. The method as in claim 2, wherein each of the plurality of individual elongated members have different lengths.

\* \* \* \* \*